(12) United States Patent
Amin

(10) Patent No.: US 8,051,423 B2
(45) Date of Patent: *Nov. 1, 2011

(54) SYSTEM AND METHOD FOR TRACKING RESOURCES DURING PARALLEL PROCESSING

(75) Inventor: Minesh B. Amin, Mountain View, CA (US)

(73) Assignee: MBA Sciences, Inc., Mountain View, CA (US)

(*) Notice: Subject to any disclaimer, the term of this patent is extended or adjusted under 35 U.S.C. 154(b) by 809 days.

This patent is subject to a terminal disclaimer.

(21) Appl. No.: 12/027,016

(22) Filed: Feb. 6, 2008

(65) Prior Publication Data

US 2008/0189709 A1 Aug. 7, 2008

Related U.S. Application Data

(60) Provisional application No. 60/888,414, filed on Feb. 6, 2007, provisional application No. 60/888,446, filed on Feb. 6, 2007.

(51) Int. Cl.
*G06F 9/46* (2006.01)
*G06F 9/455* (2006.01)
*G06F 15/173* (2006.01)

(52) U.S. Cl. ........ 718/104; 718/102; 719/310; 709/223; 709/226

(58) Field of Classification Search ............... 718/104
See application file for complete search history.

(56) References Cited

U.S. PATENT DOCUMENTS

| | | |
|---|---|---|
| 4,791,554 A | 12/1988 | Hirota et al. |
| 4,829,422 A | 5/1989 | Morton et al. |
| 5,016,170 A | 5/1991 | Pollalis et al. |
| 5,029,169 A | 7/1991 | Smyk |
| 5,050,070 A | 9/1991 | Chastain et al. |
| 5,159,686 A | 10/1992 | Chastain et al. |
| 5,257,372 A | 10/1993 | Furtney et al. |
| 5,404,512 A | 4/1995 | Powers et al. |
| 5,440,743 A | 8/1995 | Yokota et al. |
| 5,530,860 A | 6/1996 | Matsuura |
| 5,692,193 A | 11/1997 | Jagannathan et al. |
| 5,724,600 A | 3/1998 | Ogi |
| 5,761,403 A | 6/1998 | Yamagishi |
| 5,771,343 A | 6/1998 | Hafner et al. |
| 5,845,117 A | 12/1998 | Fujita |
| 5,958,071 A | 9/1999 | Iida et al. |
| 5,999,911 A | 12/1999 | Berg et al. |
| 6,006,264 A | 12/1999 | Colby et al. |

(Continued)

OTHER PUBLICATIONS

International Search Report/Written Opinion issued in PCT/US2008/053207 on Jun. 13, 2008.

(Continued)

*Primary Examiner* — Jennifer To
(74) *Attorney, Agent, or Firm* — Pattric J. Rawlins; Procopio Cory Hargreaves & Savitch

(57) ABSTRACT

The present invention is directed to a parallel processing infrastructure, which enables the robust design of task scheduler(s) and communication primitive(s). This is achieved, in one embodiment of the present invention, by decomposing the general problem of exploiting parallelism into three parts. First, an infrastructure is provided to track resources. Second, a method is offered by which to expose the tracking of the aforementioned resources to task scheduler(s) and communication primitive(s). Third, a method is established by which task scheduler(s) in turn may enable and/or disable communication primitive(s). In this manner, an improved parallel processing infrastructure is provided.

72 Claims, 9 Drawing Sheets

U.S. PATENT DOCUMENTS

| | | | |
|---|---|---|---|
| 6,044,394 | A | 3/2000 | Cadden et al. |
| 6,058,460 | A | 5/2000 | Nakhimovsky |
| 6,081,906 | A | 6/2000 | Nishizawa et al. |
| 6,088,044 | A | 7/2000 | Kwok et al. |
| 6,178,445 | B1 | 1/2001 | Dawkins et al. |
| 6,185,609 | B1 | 2/2001 | Rangarajan et al. |
| 6,192,391 | B1 | 2/2001 | Ohtani |
| 6,199,179 | B1 | 3/2001 | Kauffman et al. |
| 6,263,358 | B1 | 7/2001 | Lee et al. |
| 6,266,708 | B1 | 7/2001 | Austvold et al. |
| 6,332,180 | B1 | 12/2001 | Kauffman et al. |
| 6,345,387 | B1 | 2/2002 | Morrison |
| 6,389,446 | B1 | 5/2002 | Torii |
| 6,397,252 | B1 | 5/2002 | Sadiq |
| 6,418,484 | B1 | 7/2002 | Radia |
| 6,445,968 | B1 | 9/2002 | Jalla |
| 6,539,435 | B2 * | 3/2003 | Bolmarcich et al. .......... 719/310 |
| 6,553,406 | B1 | 4/2003 | Berger et al. |
| 6,567,840 | B1 | 5/2003 | Binns et al. |
| 6,584,501 | B1 | 6/2003 | Cartsonis et al. |
| 6,594,785 | B1 | 7/2003 | Gilbertson et al. |
| 6,625,654 | B1 | 9/2003 | Wolrich et al. |
| 6,625,751 | B1 | 9/2003 | Starovic et al. |
| 6,662,057 | B1 | 12/2003 | Bauer et al. |
| 6,763,519 | B1 | 7/2004 | McColl et al. |
| 6,766,515 | B1 | 7/2004 | Bitar et al. |
| 6,772,367 | B1 | 8/2004 | Tarafdar et al. |
| 6,817,016 | B1 | 11/2004 | Wegman et al. |
| 6,832,378 | B1 | 12/2004 | Beatty, III et al. |
| 6,851,075 | B2 | 2/2005 | Ur et al. |
| 6,859,523 | B1 | 2/2005 | Jilk et al. |
| 6,877,157 | B2 | 4/2005 | Marco |
| 6,928,378 | B2 | 8/2005 | Lebee et al. |
| 6,959,291 | B1 | 10/2005 | Armstrong et al. |
| 6,961,941 | B1 | 11/2005 | Nelson et al. |
| 6,978,459 | B1 | 12/2005 | Dennis et al. |
| 7,028,299 | B1 | 4/2006 | Chang |
| 7,051,329 | B1 | 5/2006 | Boggs et al. |
| 7,069,556 | B2 | 6/2006 | Shah et al. |
| 7,086,063 | B1 | 8/2006 | Ousterhout et al. |
| 7,093,259 | B2 | 8/2006 | Pulsipher et al. |
| 7,117,390 | B1 | 10/2006 | Klarer et al. |
| 7,117,500 | B2 | 10/2006 | Pulsipher et al. |
| 7,137,116 | B2 | 11/2006 | Parkes et al. |
| 7,140,018 | B1 | 11/2006 | Beatty, III et al. |
| 7,159,217 | B2 | 1/2007 | Pulsipher et al. |
| 7,168,064 | B2 | 1/2007 | Ousterhout et al. |
| 7,197,700 | B2 | 3/2007 | Honda et al. |
| 7,219,121 | B2 | 5/2007 | Kaniyar et al. |
| 7,263,695 | B1 | 8/2007 | Muzaffar et al. |
| 2002/0129176 | A1 * | 9/2002 | Bolmarcich et al. .......... 709/313 |
| 2003/0037089 | A1 | 2/2003 | Cota-Robles et al. |
| 2007/0169042 | A1 | 7/2007 | Janczewski |
| 2008/0148300 | A1 * | 6/2008 | Archer et al. ................. 719/330 |

OTHER PUBLICATIONS

The Task Scheduler, Microsoft Inc.; http://technet.microsoft.com/en-us/library/BB742545.aspx.

Open MPI: A High Performance Message Passing Library, http://www.open-mpi.org.

Open MP; http://www.openmp.org.

Intel Threading Building Blocks; http://threadingbuildingblocks.org.

Minesh Amin, "A General Purpose Framework by Which to Design and Implement Task Scheduler(s) and Communication Primitive(s)", Dec. 7, 2007.

Extended European Search Report dated Oct. 27, 2010 for European Patent Application No. 08729191.

* cited by examiner

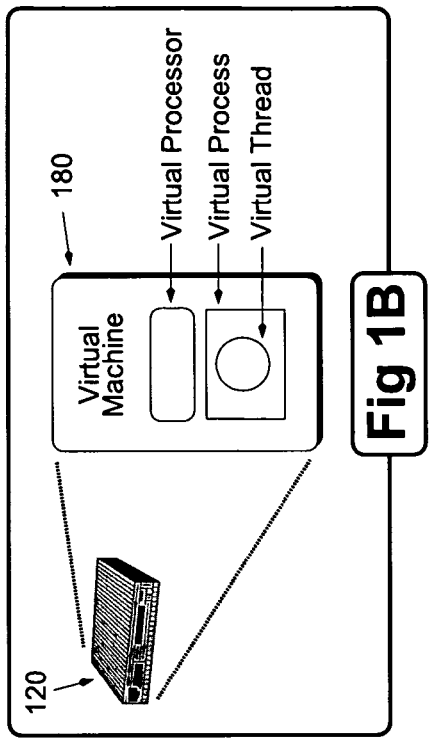
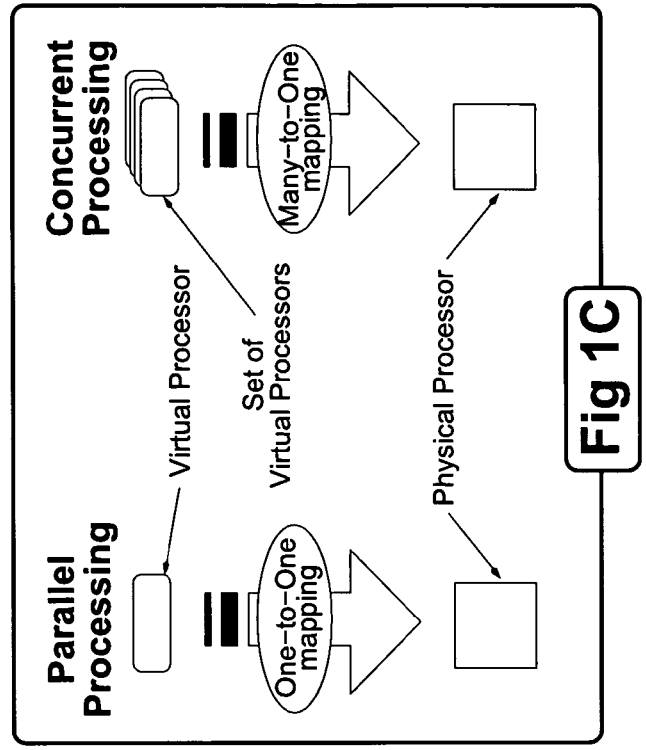
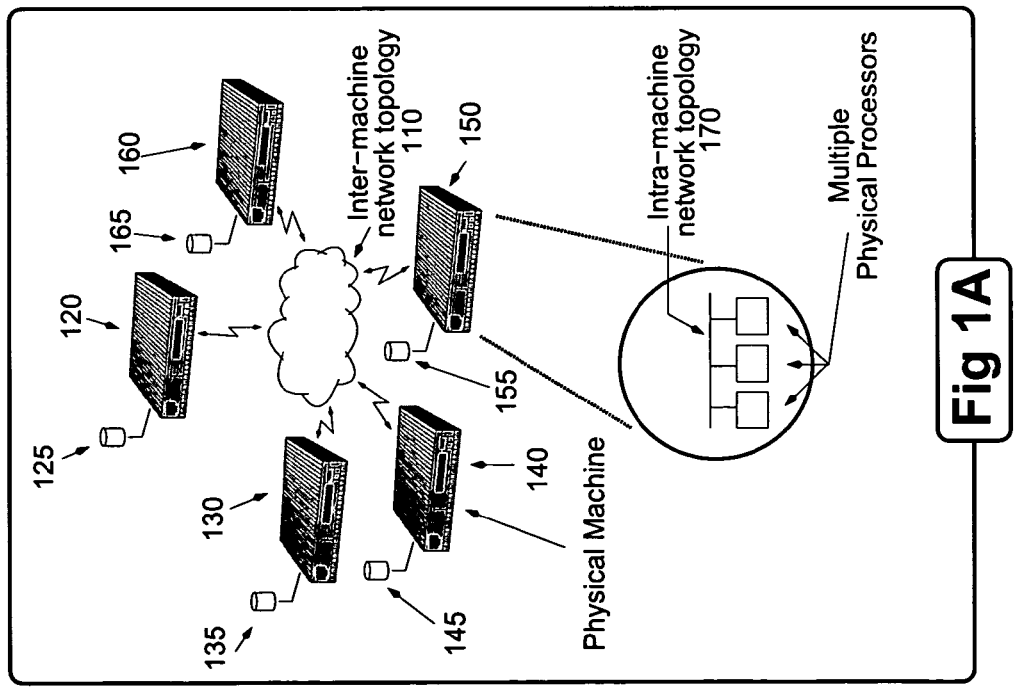

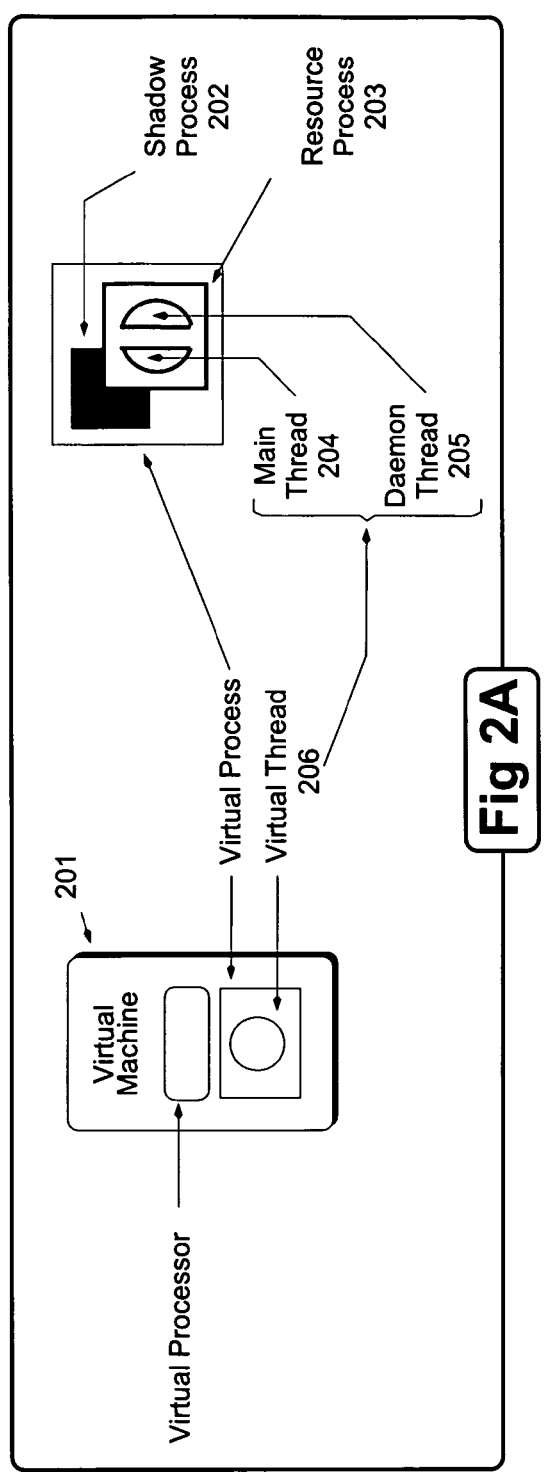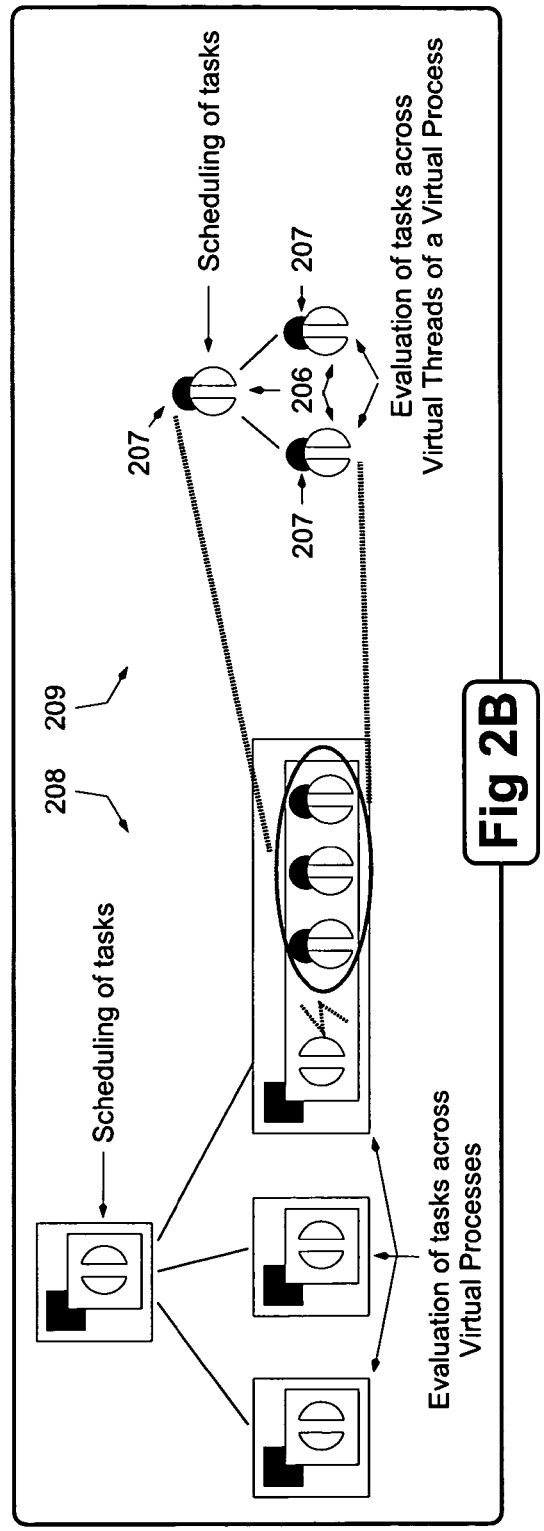

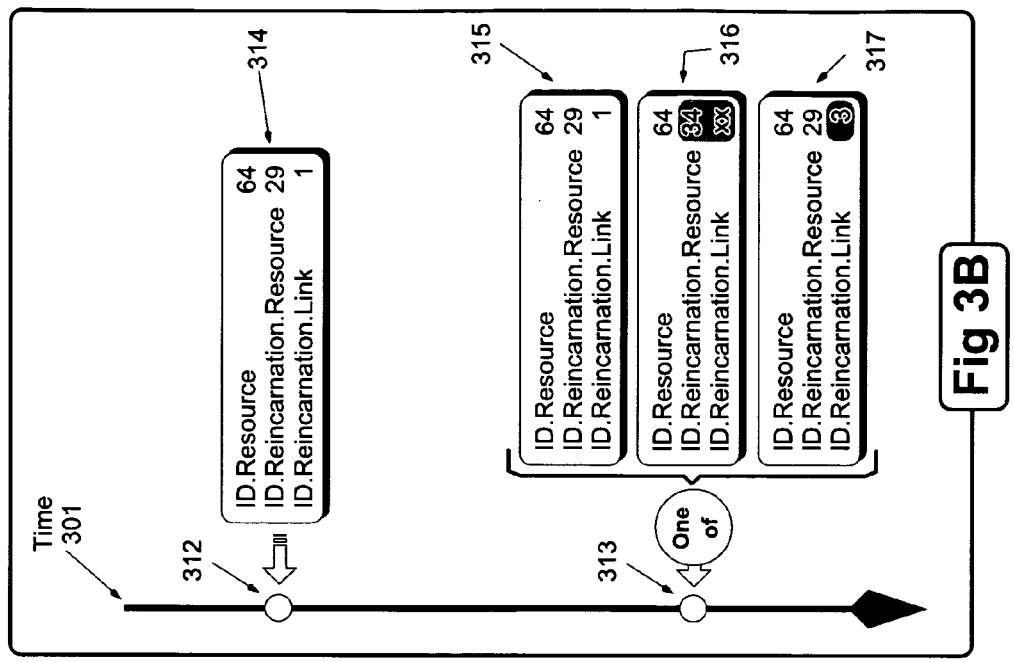
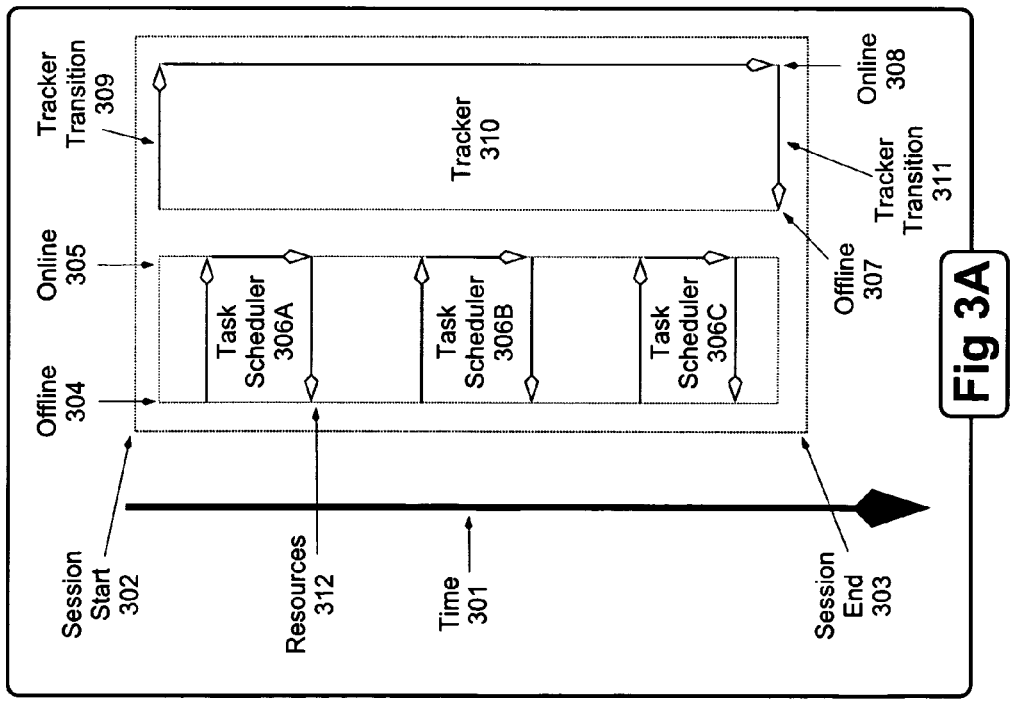
Fig 3B
Fig 3A

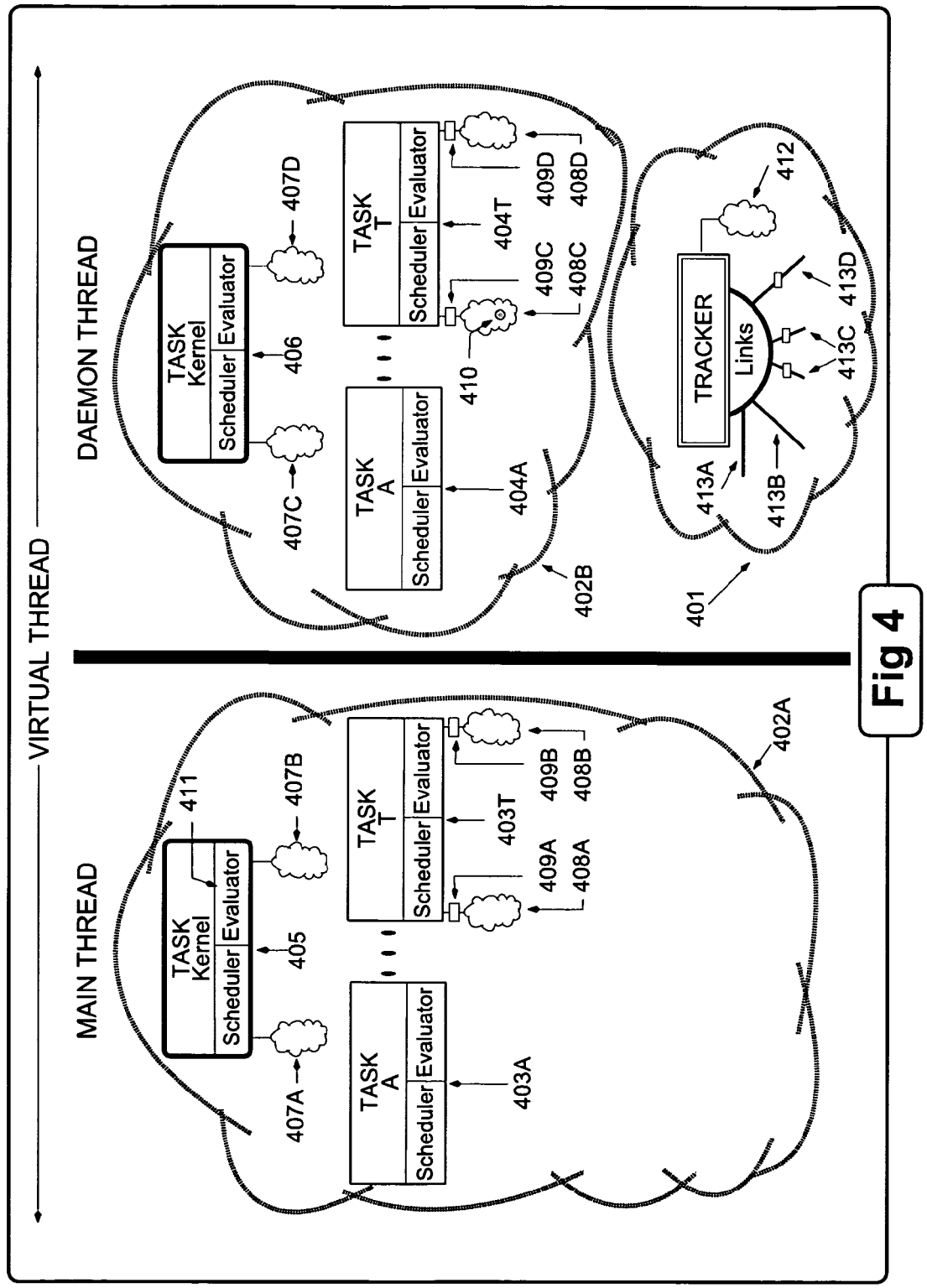

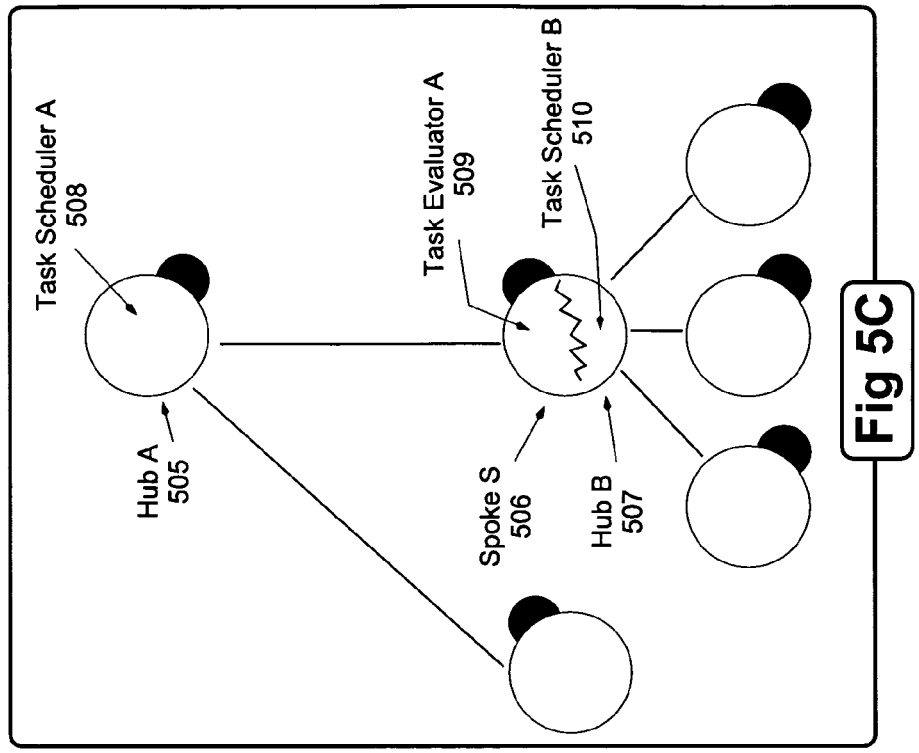
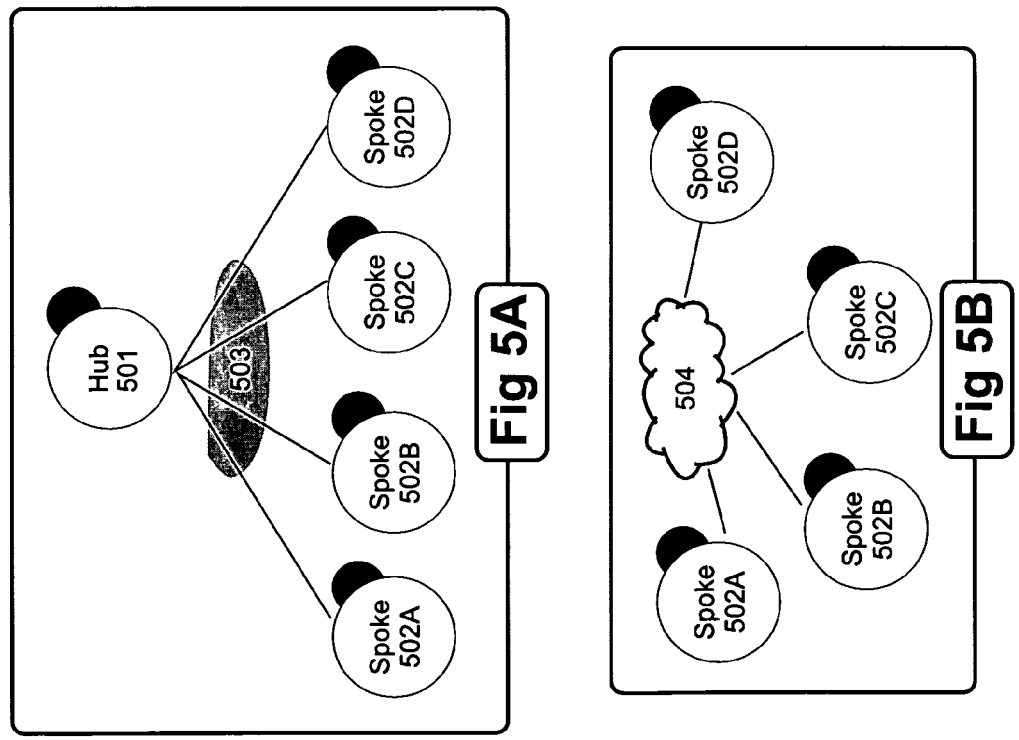

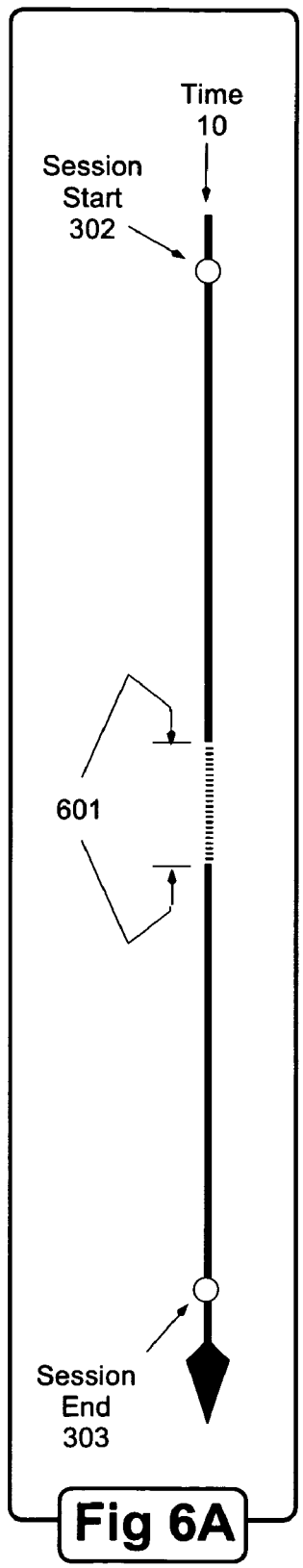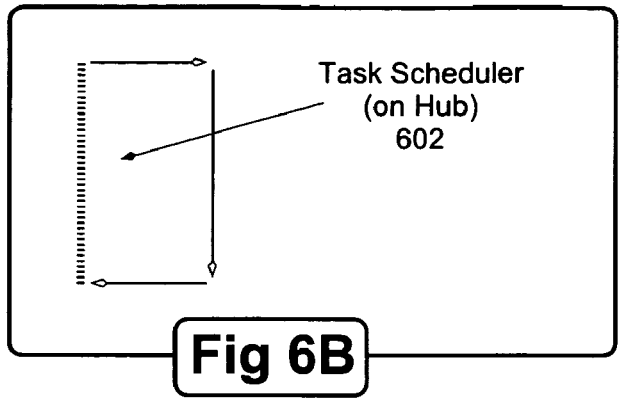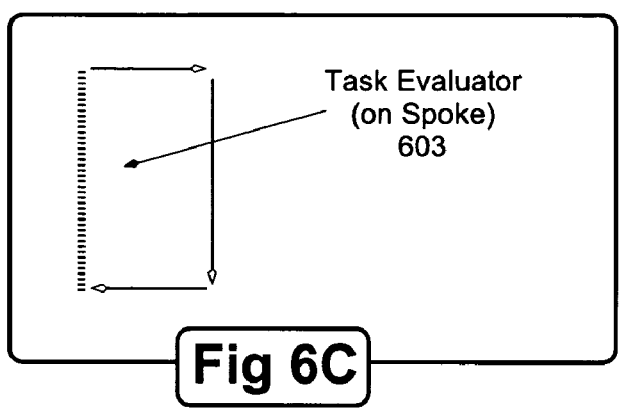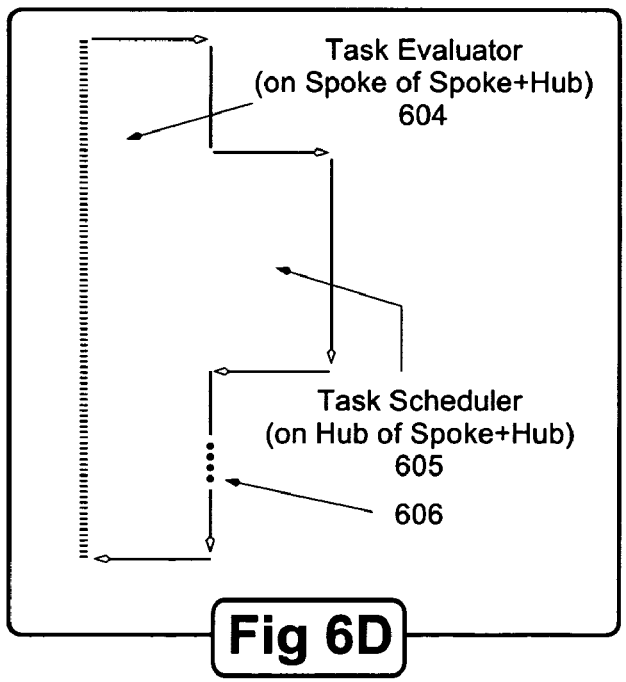

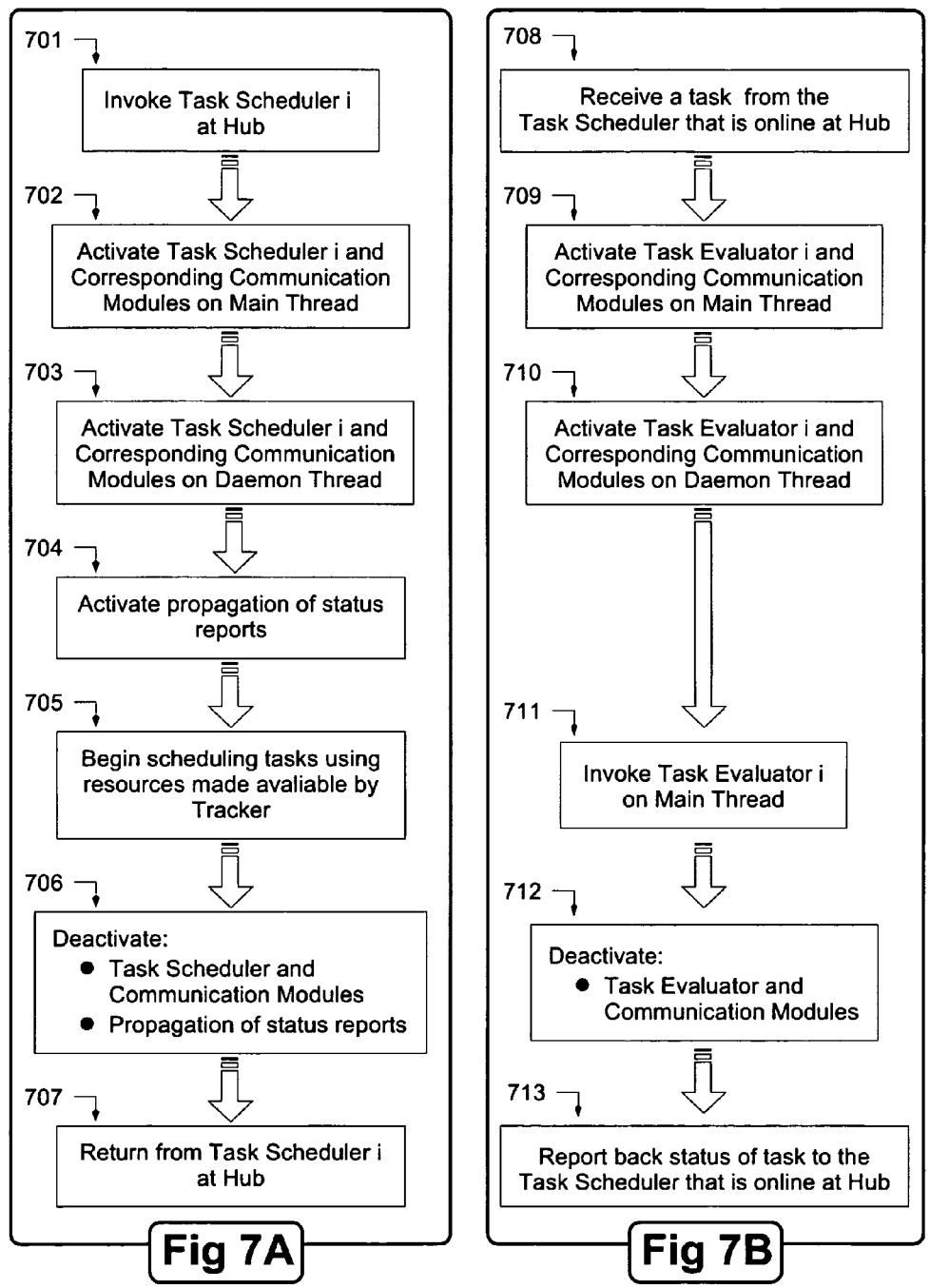

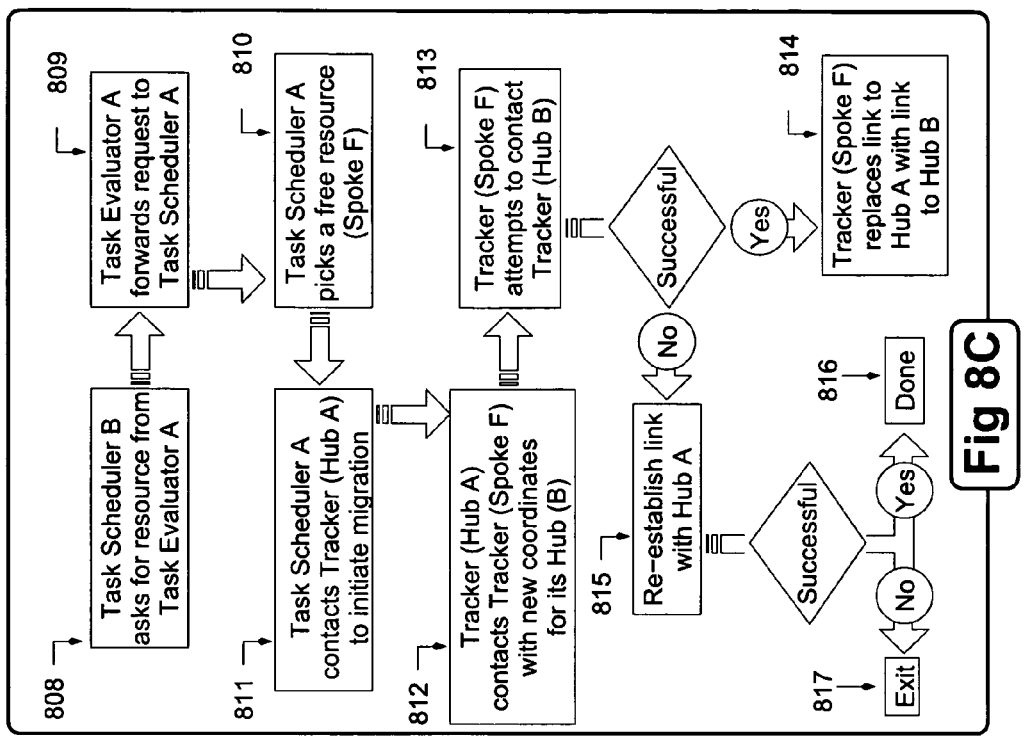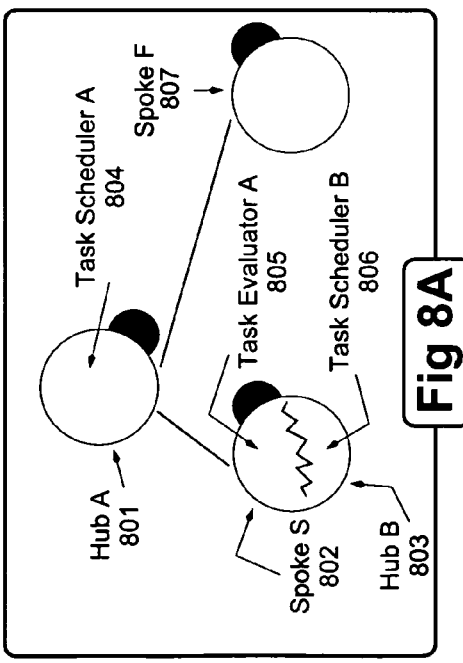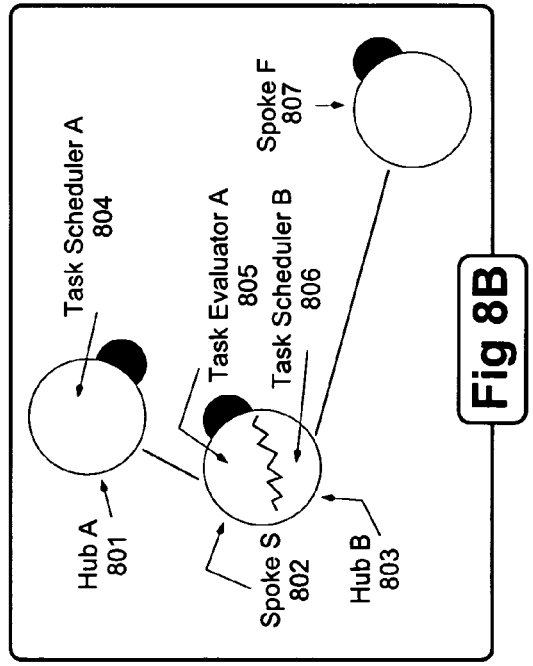

SYSTEM AND METHOD FOR TRACKING RESOURCES DURING PARALLEL PROCESSING

RELATED APPLICATION

The present application claims priority to co-pending U.S. Provisional Patent Application Ser. No. 60/888,414 entitled "A PARALLEL PROCESSING INFRASTRUCTURE" filed on Feb. 6, 2007 and co-pending U.S. Provisional Patent Application Ser. No. 60/888,446 entitled "A PARALLEL PROCESSING INFRASTRUCTURE" filed on Feb. 6, 2007, both of which are incorporated herein by reference in their entirety.

COPYRIGHT NOTICE

A portion of the disclosure of this patent document contains material, which is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

BACKGROUND

1. Field of the Invention

The present invention generally relates to parallel processing and more particularly relates to systems and methods for tracking resources during parallel processing.

2. Related Art

Parallel processing engages the concurrent use of multiple processors to solve large computational problems. Since solving large problems often requires significant time with a single processor, parallel processing allows such problems to be distributed amongst multiple processors, with each of which solving only a portion of the problem in a fraction of the time.

However, parallel processing presents significant challenges. For example, a complex task scheduler is required to efficiently distribute problem components between the multiple processors, memory resources must be properly allocated and shared, and messages must pass between the processors.

However, conventional task schedulers are inadequate for efficient parallel processing. Conventional task schedulers perform two functions: 1) tracking of resources, and 2) providing the policies by which tasks are mapped to, and hence evaluated by, resources. Unfortunately, in conventional task schedulers no clear delineation exists between tracking resources, on one hand, and the manner by which those resources are utilized, on the other. This means that a conventional task scheduler, once online, must always be online. This results in conventional parallel processing that is limited to only a single session, which also must always be online. This also results in conventional parallel processing that operates with a single set of policies within the single session.

One proposed solution is to invoke multiple sessions, each running a distinct task scheduler and implementing a different set of policies. This method is highly disadvantageous since 1) there may be a long latency time involved in obtaining the resources in the first place when the session is invoked, and 2) there is no guarantee that another session will not seize some or all of the resources the new session needs during that open time window between when the first session is killed and the new session is invoked. Thus, any solution that requires that sessions compete with each other for the same resources will significantly decrease the efficiency of the overall parallel processing system.

Another proposed solution is to work within the bounds of the tightly coupled, single session/single task scheduler/single policy scenario, but to augment the task scheduler's policy to take into account the new requirements. This method is also highly disadvantageous because the policy enforced by a task scheduler is already highly complex. For example, it must account for race conditions as a result of premature terminations, among other things. Because of the highly complex nature of the policy, a solution that requires the policy to be even more complex is highly undesirable, especially when the new policy is tangential or even incompatible with the existing policy.

Therefore, what is needed is a system and method that overcomes these significant problems found in conventional parallel processing systems as described above.

SUMMARY

The present invention provides parallel processing systems and methods that enable single session parallel processing with multiple task schedulers implementing multiple policies and communicating with each other via communication primitives. This is achieved, in one embodiment of the present invention, by decomposing the general problem of exploiting parallelism into three parts. First, an infrastructure is provided to track resources. Second, a method that exposes the tracking of the aforementioned resources to task scheduler(s) and communication primitive(s) is defined. Third, a method is provided by which task scheduler(s), in turn, may enable and/or disable communication primitive(s).

In one embodiment, the fundamental concepts of tracking resources and utilizing resources are de-coupled or separated into two modules: a tracker and a task scheduler/evaluator. The tracker is always online during a session. The task scheduler manages the execution of a collection of tasks using a collection of resources and is capable of going online or offline within a single session (i.e., the task scheduler can obtain and release resources).

In operation, after a session is invoked, any task scheduler can come online (i.e., request available resources from the tracker). The task scheduler then manages the execution of tasks using those available resources, and when done, it goes offline (i.e., releases the resources). Another task scheduler may also come online in the same session, obtain the same or different resources used by a previous task scheduler, and utilize those resources in a completely different way (i.e. under completely different policy guidelines).

The separation defined above enables the following possibilities: 1) it allows for a simpler implementation of the task schedulers; and 2) it allows for a tight coupling between a task scheduler and the communication primitives that the tasks, managed by the aforementioned task scheduler, may use when communicating. The task schedulers can be implemented more simply because each task scheduler has a more narrowly focused, discrete policy.

The tight coupling between a task scheduler and the communication primitives prevents a whole class of deadlocks from occurring. Typically, these deadlocks occur when a mismatch exists between the polices by which any task scheduler handles premature termination of tasks, and the functionality implemented in terms of the communication primitives. As an example, consider the situation where a task scheduler relaunches a task in the event of premature termination. This task relaunch is predicated on it not being able to communicate with any other task.

According to one embodiment of the present invention, the separation above, and the functionality it enables, provides: (a) the ability to enable and disable non-tracker functionality; (b) the ability to filter out stale messages (e.g., messages meant for one incarnation of a destination cannot be delivered to another incarnation of the same destination); (c) the ability to migrate resources; and (d) the ability to re-launch resources in situ (i.e., without having to coordinate the re-launch with any other entity).

In one embodiment, resources are managed using a star (backbone) topology. The center of the backbone is termed the Hub. The peripheries of the backbone are termed the Spokes. Furthermore, spoke resources can be migrated between hubs for more efficient parallel processing using the hierarchical star topology.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by studying the accompanying drawings, in which like reference numerals, refer to like parts, and in which:

FIG. 1A is a schematic block diagram representation of an example parallel hardware system composed of a set of physical machines according to an embodiment of the present invention;

FIG. 1B shows an example of how each physical machine may be used to execute a set of virtual machines according to an embodiment of the present invention;

FIG. 1C shows the two fundamental concepts of Parallel Processing, and Concurrent Processing according to an embodiment of the present invention;

FIG. 2A shows an example of a schematic block diagram representing a virtual machine that includes a virtual process that comprises two physical processes according to an embodiment of the present invention;

FIG. 2B shows an example of the two fundamental types of schedulers according to an embodiment of the present invention;

FIG. 3A is a signal diagram that shows an example parallel processing infrastructure according to an embodiment of the present invention;

FIG. 3B is a block diagram that shows an example of the attributes of a resource over time within a session according to an embodiment of the present invention;

FIG. 4 provides a high level overview of an example tracker, and how it interacts in a system that allows for the definition and implementation of task schedulers and task evaluators according to an embodiment of the present invention;

FIG. 5A is a block diagram that illustrates each level of an example backbone hierarchical topology according to an embodiment of the present invention;

FIG. 5B is a block diagram that illustrates an example the secondary topology according to an embodiment of the present invention;

FIG. 5C is a block diagram that illustrates an example of a hierarchical backbone topology according to an embodiment of the present invention;

FIG. 6A is a block diagram of an example session according to an embodiment of the present invention;

FIG. 6B is a block diagram of an example session of a task scheduler according to an embodiment of the present invention;

FIG. 6C is a block diagram of an example session of a task evaluator according to an embodiment of the present invention;

FIG. 6D is a block diagram of an example session of a task evaluator calling a task scheduler according to an embodiment of the present invention;

FIG. 7A is a block diagram that illustrates an example of the sequence of events that enable a task scheduler to come online, schedule, and when done, go offline according to an embodiment of the present invention;

FIG. 7B is a block diagram that illustrates an example of the sequence of events that enable a task evaluator to come online, evaluate, when done, go offline, and finally report the task's status back to the task scheduler according to an embodiment of the present invention;

FIG. 8A is a block diagram that illustrates an example of how a Hub interacts with its Spokes according to an embodiment of the present invention;

FIG. 8B is a block diagram that illustrates an example of how a parent Hub migrates a Spoke to one of its child Hub according to an embodiment of the present invention;

FIG. 8C is a block diagram that illustrates an example of how a resource is migrated from a Hub to another Hub according to an embodiment of the present invention;

DETAILED DESCRIPTION

Figure 9:
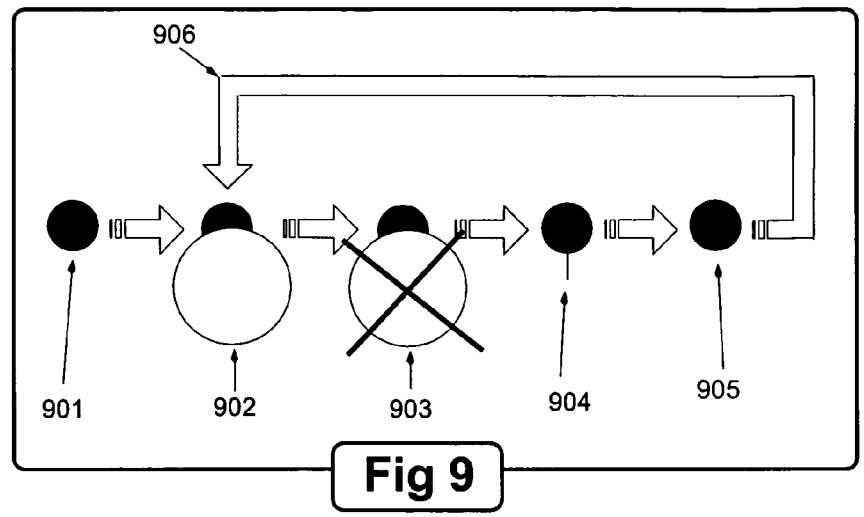
FIG. 9 is a block diagram that depicts an example of the manner in which a resource is launched, and if need be, relaunched according to an embodiment of the present invention.

Certain embodiments as disclosed herein provide a parallel processing infrastructure with a resource tracking method and system. This is achieved, in one embodiment of the present invention, by decomposing the general problem of exploiting parallelism into three parts. First, an infrastructure is provided to track resources. Second, a method that exposes the tracking of the aforementioned resources to task scheduler(s) and communication primitive(s) is defined. Third, a method is provided by which task scheduler(s), in turn, may enable and/or disable communication primitive(s).

The parallel processing infrastructure can be utilized in a number of environments, including an architecture with multiple processors, a distributed computing environment, a global network of processors, or any other environment where it is desirable to subdivide the execution of a computer program between multiple processors.

After reading this description, skilled practitioners in the art will appreciate how to implement the invention in various alternative embodiments and alternative applications. However, although various embodiments of the present invention will be described herein, it is understood that these embodiments are presented by way of example only, and not limitation. As such, this detailed description of various alternative embodiments should not be construed in any way to limit the scope or breadth of the present invention as set forth in the appended claims.

Skilled practitioners will further appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit without departing from the invention.

FIG. 1A shows a schematic block diagram representative of a parallel hardware system composed of a set of physical machines (120, 130, 140, 150, 160) interconnected via a physical inter-machine topology (110). In the illustrated embodiment, each physical machine may have one or more physical processors, and the machines or individual processors can be connected to each other via an intra-machine topology (170) or an inter-machine topology 110 as appropriate.

Each physical machine may be used to execute a set of virtual machines, as depicted in FIG. 1B; thus giving rise to two fundamental concepts, depicted in FIG. 1C, Parallel Processing, and Concurrent Processing. Parallel Processing refers to the mapping of a single virtual processor on a single physical processor. Concurrent Processing refers to mapping multiple virtual processors on a single physical processor. For the purposes of this description, the term parallel processing shall refer to both Parallel Processing and Concurrent Processing.

Note that all physical machines need not be identical. So, in the context of Parallel Processing, for example, machine 120 contains only one physical processor, and therefore would execute only one virtual machine 180, as depicted in FIG. 1B. Machine 150, on the other hand, contains multiple physical processors, and therefore, may potentially execute many virtual machines.

FIG. 2A shows a schematic block diagram representing a virtual machine (201) that includes a virtual process that comprises two physical processes: (a) shadow process (202), and (b) resource process (203). The shadow process controls launching, and if need be, relaunching of the resource process. The resource process comprises at least two physical threads; the first two of which are labeled main (204) and daemon (205), respectively. Note that in one embodiment, all resources (a collection of virtual machines, or a collection of virtual threads within a virtual machine) are tracked using a star (backbone) topology. The center of the backbone is termed the Hub. The peripheries of the backbone are termed the Spokes.

There are two fundamental types of schedulers, as depicted in FIG. 2B: ones that schedule tasks across a collection of virtual machines (208), and ones that schedule tasks across a collection of virtual threads within a virtual machine (209). Note that in both cases, the fundamental unit of execution, and hence resource, is the virtual thread (206). Furthermore, each, except the first, virtual thread is shadowed by a shadow thread (207). The role of the shadow thread is analogous to the role played by the shadow process; namely, to launch and, if need be, relaunch physical threads that make up a virtual thread. In other words, the first virtual thread is shadowed by the shadow process, while the rest of the virtual threads are shadowed by their respective shadow threads. The reason for this distinction: a virtual process by definition must have at least one virtual thread. Since a virtual process already has a shadow process monitoring it, the first virtual thread need not be shadowed by a shadow thread. For the purposes of this description, unless specified otherwise, we shall refer to the respective shadows as simply Shadows.

FIG. 3A is a signal diagram that shows an example parallel processing infrastructure according to one embodiment of the present invention. In the illustrated embodiment, the two main functionalities—task schedulers (306A, 306B, 306C) and the tracker (310)—are shown within a single session that starts at time 302 and concludes at time 303. The tracker functionality comes online once (309), and comes offline once (311). However, task schedulers, unlike the tracker, may come online and offline numerous times (306A, 306B, 306C). Note that in each such case, the manner by which resources are utilized may differ. As an example, 306A may utilize the first and up to ten resources made available, and ignore the rest (if any). 306B, on the other hand, may not start scheduling until it has four resources available, and utilizes more if, and when, they become available. Finally, 306C may utilize resources in increments of, for example, five.

Regardless of the manner by which the resources are utilized, note that the tracker tracks each resource in terms of three attributes: (a) ID.Resource—a number that is unique across all resources, (b) ID.Reincarnation.Resource—a number that is unique across all reincarnations of a particular resource, and (c) ID.Reincarnation.Link—a number that is unique across all reincarnations of the link between each resource and its Hub. As a result, task scheduler 306C, for example, may limit itself to using a specific set of resources utilized at some point in the past (at, say time 312). For example, consider some resource with attributes 314 of ID.Resource=64, ID.Reincarnation.Resource=29 and ID.Reincarnation.Link=1, respectively, at time 312, as depicted in FIG. 3B. The same resource at time 313 can have only one of three sets of attributes (assuming the resource still exists): (a) attributes 315—the resource is the same incarnation as found at time 312, (b) attributes 316—the resource is some new incarnation that followed the one at time 312, or (c) attributes 317—the resource is the same incarnation as found at time 312, but was migrated by some task scheduler (running on the current resource) to another task scheduler (running on some other resource), and back. Needless to say, details on how migration takes place, and how the respective values are computed will be covered later.

FIG. 4 provides a high level overview of an example tracker 401, and how it interacts in a system that allows for the definition and implementation of task schedulers and task evaluators (402A, 402B). The tracker 401 is executed on the daemon thread, while the task schedulers are invoked and tasks are evaluated on the main thread.

The functionality of each task scheduler and evaluator, labeled A through T, is defined in terms of modules meant to be executed on the main thread (403A through 403T) and the daemon thread (404A through 404T). Task functionality common across all task schedulers and evaluators are defined in the Task Kernel sub-modules (405 and 406 on the main and daemon thread, respectively). Furthermore, where applicable, all the task scheduler/evaluator modules labeled A through T (on both the main and daemon threads) control access to communication primitives that the respective tasks may use when communicating within the virtual thread, or across virtual threads. To provide fine-grain control over the directions these communication primitives (labeled 408A/B/

C/D) may have, their access is controlled by the scheduler or evaluator sub-modules (labeled 409A/B/C/D).

Note that not all task scheduler/evaluator modules need to provide communication primitives, as illustrated by task scheduler/evaluator A; in such cases, since no communication primitives are defined, tasks cannot communication with any other entity. Moreover, note that the communication primitives defined in Task Kernel and Tracker modules (405, 406, 401) are inaccessible to both the callers of task schedulers and the callees of task evaluators.

One advantage of this framework is that it permits direct invocation of any task scheduler (labeled 403A through 403T) on the Hub. At the same time, it allows for the reception of any task on the Spoke without a prior knowledge (labeled 411). One consequence of this layout: each task scheduler sub-module on the main thread must define its own event loop to route all incoming messages. This, in turn, means the communication primitives (labeled 408A) meant to be executed on the main thread at the Hub must be designed so that they may only reply to a message, or process any incoming message; i.e. they may not initiate a message, or wait for a specific message. The details of how a task scheduler is invoked on the Hub, and how a task is evaluated on the Spoke shall be covered later.

The tracker module, 401, has four sets of links. The first one, 413A, is to the main thread. The second one, 413B, is to the Shadow. The third, 413C, (set of links) connect with the Spokes (if any). The fourth, 413D, connects with the Hub (if any). The link 413A is created when the daemon thread is created. The details of how the last three types of links are set up and utilized will be covered later. Note that links with the main thread (413A), shadow (413B), and Hub—in case of a Spoke—(413D) must always be online for the virtual thread to be in existence. If for any reason, any one of these links are offline (i.e. non operational), the tracker module would close down all four sets of links, and self destruct the virtual thread.

However, links to Spokes (413C) are handled with special care by the Tracker module (401); it propagates any change in status of the links (413C) to the Task Kernel module 406. Details on what constituents a status report shall be covered later.

Any suitable form of communication may be used, such as, for example, pipes, signals, message queues, semaphores, shared memory, sockets, or any other suitable form, as the invention is not limited in this respect. In addition, any suitable network protocol or protocols may be used as the invention is not limited in this respect either. For example, in some embodiments, the TCP/IP protocol may be used, even though the communications are not necessarily traveling over the inter-machine topology.

The scheduler portion of the Task Kernel module 406 is the recipient of all status reports from the Tracker module 401, which, in turn, forwards the status reports to (a) the scheduler portion of the Task Kernel module 405—if some task scheduler is online on the main thread; and (b) all communication primitives, say, 408C (on the daemon thread) that would like to have access to said status reports regardless of whether some task scheduler is online (on the main thread) or not, as depicted in FIG. 4 (410). The later can be leverage by any communication primitive that provides, for example, parallel lock functionality across, say, many virtual processes. In this case, the parallel lock functionality implemented by the communication primitive needs to track resources regardless of whether any task scheduler is online or not. Note that in another embodiment, the Task Kernel module 406 can define the exact order in which all communication primitives 408C are notified of the status reports.

The tracker functionality tracks resources by way of a (backbone) hierarchical topology (an example topology of the present invention). FIG. 5A is a block diagram showing each level in the (backbone) hierarchical topology. The center of the backbone is termed a Hub (501). The peripheries of the backbone are termed the Spokes (502A, 502B, 502C, 502D). Furthermore, the task schedulers are invoked on the Hub, while the tasks are evaluated at the Spokes.

The tasks may communicate using the existing backbone topology, 503, or may utilize the secondary topology, 504, as depicted in FIG. 5B. In some embodiments, the creation and deletion of the secondary topology is guided by, and whose usage, including direction, is enabled and disabled by, the task scheduler that is online at the Hub. This is achieved by augmenting the existing framework in three ways: (a) definition of the virtual thread is augmented to include a new (separate) thread analogous to the daemon thread, but one whose Tracker module would create, manage, and route messages meant for link(s) in the secondary topology; (b) the Tracker module (401) is augmented to include a link to the aforementioned (new) thread; and (c) the task/evaluator modules (A through T) on all threads are augmented to provide access to communication primitives meant for secondary topology. In some embodiments, the framework can be further augmented to support many secondary topologies. Nevertheless, the pertinent point is this: there should be a tight coupling between a task scheduler/evaluator and the communication primitives that the tasks may use.

FIG. 5C depicts the set up of a hierarchal backbone topology. For example, Hub A, 505, tracks a collection of resources (that are its spokes); one of which is Spoke S, 506. Spoke S, in turn, is also a Hub (Hub B—507). This recursive definition of Spokes also becoming Hubs is achieved in a well-defined manner, and as depicted in FIG. 6D. Normally, each Spoke is assigned a task by its Hub, which then gets evaluated. However, hierarchal topology is created when a Spoke is assigned a task whose evaluation results in the invocation of some task scheduler, as depicted in 605 (FIG. 6D).

To summarize, at any moment in time 601 (FIG. 6A), each node within a hierarchal backbone topology is one whose main thread is either (a) offline; (b) executing a task scheduler, as depicted in FIG. 6B—this is only possible at the one/only root node of the hierarchical backbone topology; (c) executing a task evaluator, as depicted in FIG. 6C; or (d) executing a task evaluator which in turn has evoked a task scheduler, as depicted in FIG. 6D. Furthermore, a task evaluator may invoke multiple task schedulers before concluding as long as they are one after the other, as depicted in 606 (FIG. 6D).

The previous discussion has detailed how the tracking functionality in parallel processing is decoupled from the task scheduling and task evaluation functionalities, and has also described the general framework through which the task schedulers interact with the tracker. Next to be described are four abilities that enable efficient and robust resource tracking.

Ability to Enable and Disable Non-Tracker Functionality

FIG. 7A illustrates the sequence of events that enable a task scheduler to come online, schedule, and when done, go offline, at a Hub. Upon invocation (701) of some Task Scheduler, say, T, on the main thread (as depicted by 403T in FIG. 4), four steps are taken.

First (702): (a) the corresponding communication primitives labeled 408A are enabled by making them publicly accessible by way of the API labeled 409A; (b) the scheduler sub-module of the Task Kernel on the main thread labeled 405 is invoked; the return value of which is the initial snapshot of the resources tracked by the Tracker (401). Furthermore, from this point on, Task Kernel module 406 would send messages containing incremental status reports (from the Tracker 401) over the link 413A.

Second (705), the scheduling of tasks using resources made available by the Tracker (401) is commenced. Third (706), when done scheduling of tasks, all non-Tracker scheduling functionality (on both the main and daemon threads) is deactivated. Note that one side-effect of this is the disabling of the propagation of status reports (from the Tracker 401) by way of Task Kernel module 406. Finally (707), the scheduler sub-module 403T returns back to the caller.

Expanding on the invocation of the scheduler sub-module of the Task kernel (405) in the first step, a blocked message is sent to the scheduler sub-module of the Task Kernel on the daemon thread (labeled 406) over the link 413A. Up on receiving the message, the scheduler performs acts labeled 703 and 704; namely, the scheduler activates the scheduler sub-module of module Task T (labeled 404T) and the corresponding communication primitives (labeled 409C), and activates the forwarding of status reports from the Tracker over the link 413A to the scheduler sub-module of Task T module (403T). The reply contains the current snapshot of the status reports of all the resources tracked by the Tracker (401).

Note that each entry in the status reports corresponds to the tuple (ID.Resource, ID.Reincarnation.Resource, ID.Reincarnation.Link, ID.status). ID.status is online if the link is functional; or else it is offline.

Conversely, FIG. 7B illustrates the sequence of events that enable a task evaluator to come online, evaluate, when done, go offline, and finally report the task's status back to the task scheduler (at the Hub). First (708), a task is assigned by a task scheduler, and delivered via the link 413D to the main thread, where the Spoke waits in an even loop inside the Task Kernel evaluator sub-module (411). Second (709), upon receiving this task, the content of the task is probed to determine the type of the task; let T denote the type of the task. Next, the task evaluator, of type T, (408B) and the corresponding communication primitives (409B) are enabled. Third (710), the corresponding communication primitives for type T (409C) on the daemon thread are enabled (409D) (by way of a message from 405 to 406). Fourth (711), the evaluator sub-module within 403T is invoked. Fifth (712), having finished evaluating the task, all primitives and functionality enabled in the previous steps are disabled. Finally (713), the status of the task is reported back to the task scheduler using communication primitives 407B, and the Spoke event loop inside the Task Kernel evaluator sub-module (411), waiting for another task.

Finally, it should be apparent to those skilled in the art how steps (702, 703, 704, 706) and (709, 710, 712) need to be augmented as needed if the task scheduler/evaluator T provides access to communication primitives for the secondary topology.

Ability to Filter Stale Messages

There can be only one source of stale messages: ones from the Hub (via one of the links labeled 413C) to some Spoke (via link 413D). The creation of each such link is initiated by the Spoke, details of which we shall cover later. Suffice it to say, once the link is established, the first message sent over the link is from the Spoke (over 413D) to the Hub (over the just established link—one of 413C), and it contains two numbers: ID.Resource, and ID.Reincarnation.Resource. The Hub, upon receiving this message, associates a unique number, ID.Reincarnation.Link, with this newly established link.

The three attributes, ID.Resource, ID.Reincarnation.Resource, and ID.Reincarnation.Link, form the basis by which stale messages get removed at the Hub before they are transmitted to the Spoke. In other words, the headers for all messages meant for transmission over the link (413C) to the Spoke must have the same three attributes. Otherwise, the messages are simply discarded.

Therefore, the sources of all such messages need to be notified if, and when, the link goes both online and offline. There is one source for such messages: the sub-modules that implement communication primitives across all types of task scheduler and evaluators. This is achieved by having the tracker functionality propagate any change in status with respect to any link (to the Spokes) to the Task Kernel modules on all threads within a virtual thread, and whose details we covered when describing the enabling and disabling of non-tracker functionality in the previous section.

Note that the Spokes cannot be the source of stale messages because: (a) the framework has the event loop for all task evaluators centralized at 411, thus ensuring that there is only one way by which any task evaluator can go offline—as long as this transition from online to offline happens after all messages from the said task evaluator are sent; (b) communication primitives at the Hub can only reply; and (c) Tracker module (401) self destructs the virtual thread if link 413D is non operational.

Finally, note that this method can be extended to filter stale messages over any secondary topology, which should be recognized and be obvious to those skilled in the art.

Ability to Migrate Resources

The creation of a hierarchy of resources is achieved by migrating resources from a Hub to some of its Spoke(s), as depicted in FIGS. 8A and 8B. A migration of resource is triggered by a task scheduler that is invoked by a task evaluator at some Spoke. For example, Spoke S (802) is assigned a task by task scheduler A (804), which when evaluated results in the invocation of task scheduler B (806). At this point, the task scheduler B needs resources in order to scheduler tasks. The only option available, if no resources exist, is for it to ask for the resources from task scheduler A (804) by way of its caller (task evaluator A 805). Conversely, the opposite migration takes place when task scheduler B (806) is done scheduling tasks, and hence does not need the resources any more.

FIG. 8C illustrates an embodiment of how a resource is migrated from a parent Hub to its child Hub. First (808), a task scheduler, say, B asks for a resources from its caller (task evaluator, say, A). Second (809), since the caller is a Spoke, and hence cannot have access to resources, it forwards the request to the task scheduler running on its Hub. Third (810), task scheduler A picks a free resource (one of its Spokes, say F) as a candidate for migration. Fourth (811), the task scheduler on Hub A (801) contacts its Tracker module on Hub A (801) to initiate the migration of Spoke F. Fifth (812), the Tracker module on Hub A (801) contacts the Tracker module on Spoke F (807) with the new coordinates (i.e. way by which to contact the Tracker module of its new Hub). Sixth (813), the Spoke F attempts to contact the Tracker on its new Hub (B—803). If the attempt is successful (814), the Tracker module running on Spoke F replaces link to original Hub (A) with link to new Hub (B). On the other hand, if the attempt is not successful (815), an attempt is made to re-establish link with the existing Hub (A); if attempt is successful (816), original link to Hub (A) is replaced with new link to the same Hub (A), else (817) Tracker module self destructs the virtual thread.

The end result of a successful migration (814) is: (a) the generation of a status report (by Tracker module at Hub A—801) containing attributes indicating that a link went offline, and (b) the generation of a status report (by Tracker module at Hub B—803) containing attributes indicating that a link went online. The end result of a failure to migrate is: (a) in case of both 816 and 817, the generation of a status report (by Tracker module at Hub A—801) containing attributes indicating that a link went offline, followed by (b) in case of 816 only, the generation of a status report (by Tracker module at Hub A—801) containing attributes indicating that a link went online.

Finally, note that this method can be extended by those skilled in the art so that the request for migration can be forwarded up the hierarchy (i.e. to parent Hub of Hub A). Conversely, there are many ways by which a resource can be giving up, and to which Hub.

Ability to Relaunch Resources In-Situ

FIG. 9 depicts the manner in which the Shadow launches, and if need be, relaunches the Hub or Spoke. Note that the Shadow is launched only once (901), and is provided with a unique number across all resources, ID.Resource. The Shadow, in turn, generates a number unique across all launches and relaunches of the Hub or Spoke (902), ID.Reincarnation.Resource. These two numbers, ID.Resource and ID.Reincarnation.Resource, are made available to the Hub or Spoke (903).

FIG. 9 (903) depicts the normal or premature termination of the Hub or Spoke. In the case where the link is a pipe, message queue or socket based on the, say, TCP/IP protocol, this termination manifests itself as an EOF on the link 904 (at Shadow)—904. Note that signals may also be utilized to detect the termination of either a child process (in case a Shadow is a shadow process), or a child virtual thread (in case a Shadow is a shadow thread). At this point, the Shadow proceeds to clean up data structures, and prepares to relaunch the resource by repeating step 902, only this time with another (different) ID.Reincarnation.Resource number.

Note that since the default action of the shadow is to always relaunch a resource; the only way to break the cycle is for a resource to notify its shadow to skip step 906 prior to termination. Furthermore, each relaunch is achieved in situ; i.e., without the Shadow having to coordinate this relaunch with any other entity, process or resource.

Figure 10:
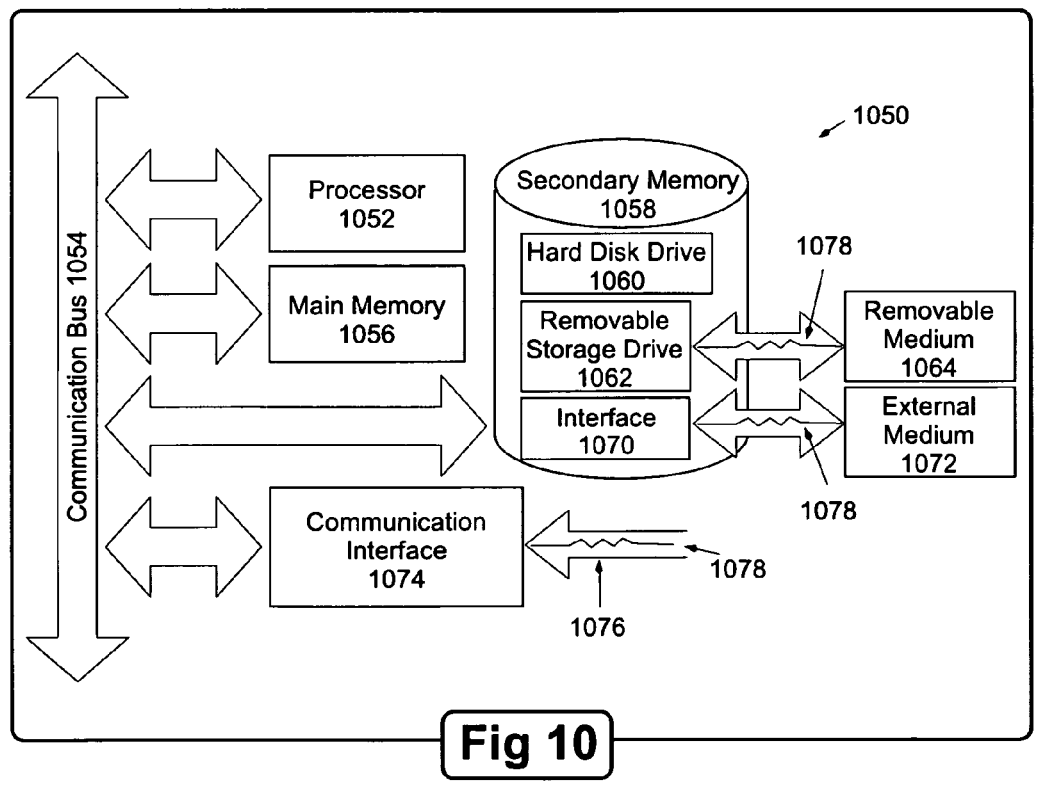
FIG. 10 is a block diagram illustrating an example computer system that may be used in connection with various embodiments described herein.

FIG. 10 is a block diagram illustrating an example computer system (1050) that may be used in connection with various embodiments described herein. For example, the computer system (1050) may be used in conjunction with a parallel processing infrastructure. However, other computer systems and/or architectures may be used, as will become clear to those skilled in the art.

The computer system 1050 preferably includes one or more processors, such as processor 1052. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1052.

The processor 1052 is preferably connected to a communication bus 1054. The communication bus 1054 may include a data channel for facilitating information transfer between storage and other peripheral components of the computer system 1050. The communication bus 1054 further may provide a set of signals used for communication with the processor 1052, including a data bus, address bus, and control bus (not shown). The communication bus 1054 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 1050 preferably includes a main memory 1056 and may also include a secondary memory 1058. The main memory 1056 provides storage of instructions and data for programs executing on the processor 1052. The main memory 1056 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1058 may optionally include a hard disk drive 1060 and/or a removable storage drive 1062, for example a floppy disk drive, a magnetic tape drive, a compact disc ("CD") drive, a digital versatile disc ("DVD") drive, etc. The removable storage drive 1062 reads from and/or writes to a removable storage medium 1064 in a well-known manner. Removable storage medium 1064 may be, for example, a floppy disk, magnetic tape, CD, DVD, etc.

The removable storage medium 1064 is preferably a computer readable medium having stored thereon computer executable code (i.e., software) and/or data. The computer software or data stored on the removable storage medium 1064 is read into the computer system 1050 as electrical communication signals 1078.

In alternative embodiments, secondary memory 1058 may include other similar means for allowing computer programs or other data or instructions to be loaded into the computer system 1050. Such means may include, for example, an external storage medium 1072 and an interface 1070. Examples of external storage medium 1072 may include an external hard disk drive or an external optical drive, or and external magneto-optical drive.

Other examples of secondary memory 1058 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 1072 and interfaces 1070, which allow software and data to be transferred from the removable storage unit 1072 to the computer system 1050.

Computer system 1050 may also include a communication interface 1074. The communication interface 1074 allows software and data to be transferred between computer system 1050 and external devices (e.g. printers), networks, or information sources. For example, computer software or executable code may be transferred to computer system 1050 from a network server via communication interface 1074. Examples of communication interface 1074 include a modem, a network interface card ("NIC"), a communications port, a PCMCIA slot and card, an infrared interface, and an IEEE 1394 fire-wire, just to name a few.

Communication interface 1074 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 1074 are generally in the form of electrical communication signals 1078. These signals 1078 are preferably provided to communication interface 1074 via a communication channel 1076. Communication channel 1076 carries signals 1078 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 1056 and/or the secondary memory 1058. Computer programs can also be received via communication interface 1074 and stored in the main memory 1056 and/or the secondary memory 1058. Such computer programs, when executed, enable the computer system 1050 to perform the various functions of the present invention as previously described.

In this description, the term "computer readable medium" is used to refer to any media used to provide computer executable code (e.g., software and computer programs) to the computer system 1050. Examples of these media include main memory 1056, secondary memory 1058 (including hard disk drive 1060, removable storage medium 1064, and external storage medium 1072), and any peripheral device communicatively coupled with communication interface 1074 (including a network information server or other network device). These computer readable mediums are means for providing executable code, programming instructions, and software to the computer system 1050.

In an embodiment that is implemented using software, the software may be stored on a computer readable medium and loaded into computer system 1050 by way of removable storage drive 1062, interface 1070, or communication interface 1074. In such an embodiment, the software is loaded into the computer system 1050 in the form of electrical communication signals 1078. The software, when executed by the processor 1052, preferably causes the processor 1052 to perform the inventive features and functions previously described herein.

While the particular system and method shown herein and described in detail is fully capable of attaining the above described objects of this invention, it is to be understood that the description and drawings presented herein represent a presently preferred embodiment of the invention, and are therefore, representative of the subject matter which is broadly contemplated by the present invention. It is further understood that the scope of the present invention fully encompasses other embodiments that may become obvious to those skilled in the art.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer implemented method for parallel processing of computer instructions on a plurality of processors located in one or more physical machines that are communicatively coupled with each other via a communication infrastructure, wherein the computer instructions are stored on a computer readable medium accessible by one or more of the processors, the method comprising:

mapping a plurality of virtual processors to a plurality of processors;

creating a parallel processing session comprising the plurality of virtual processors;

executing a tracker module within said parallel processing session on one of said plurality of virtual processors, the tracker module configured to coordinate communication between tasks being evaluated by declaring and defining communication primitives prior to a task evaluator coming online;

executing a plurality of task schedulers within said parallel processing session on said plurality of virtual processors, each task scheduler configured to obtain resource processes from the tracker module, said resource processes configured to evaluate one or more tasks; and executing one or more task evaluators within said parallel processing session and under control of a task scheduler, wherein a task evaluator executes a set of instructions that comprise a task;

maintaining a hierarchical parallel processing infrastructure by the tracker module, said hierarchical parallel processing infrastructure comprising a plurality of links between the plurality of task schedulers, the one or more task evaluators, and the resource processes, wherein each link has an associated identifier; and addressing communications between the plurality of task schedulers, the one or more task evaluators, and the resource processes using a combination of link identifiers.

2. The method of claim 1, further comprising sending a communication to the tracker module by a task scheduler to request an available resource process.

3. The method of claim 1, further comprising going offline with a first task scheduler when execution of a last task evaluator under control of the first task scheduler is complete while continuing execution of the tracker module within the parallel processing session.

4. The method of claim 3, further comprising going online with a second task scheduler while continuing execution of the tracker module within the parallel processing session.

5. The method of claim 4, further comprising going offline with the second task scheduler when execution of a last task evaluator under control of the second task scheduler is complete while continuing execution of the tracker module within the parallel processing session.

6. The method of claim 1, further comprising implementing a first predetermined policy through execution of a first task scheduler in the parallel processing session and implementing a second predetermined policy through execution of a second task scheduler in the parallel processing session.

7. The method of claim 1, further comprising filtering communications by discarding communications having an invalid combination of link identifiers.

8. The method of claim 1, further comprising changing the identifier associated with a link when a task evaluator goes offline and comes back online.

9. The method of claim 1, further comprising changing the identifier associated with a link when a resource process is assigned from a first task evaluator to a second task evaluator.

10. A non-transitory computer readable medium having stored thereon code for causing a plurality of processors to perform the steps for parallel processing, the steps comprising:

mapping a plurality of virtual processors to a plurality of processors;

creating a parallel processing session comprising the plurality of virtual processors;

executing a tracker module within said parallel processing session on one of said plurality of virtual processors, the tracker module configured to coordinate communication between tasks being evaluated by declaring and defining communication primitives prior to a task evaluator coming online;

executing a plurality of task schedulers within said parallel processing session on said plurality of virtual processors, each task scheduler configured to obtain resource processes from the tracker module, said resource processes configured to evaluate one or more tasks; and executing one or more task evaluators within said parallel processing session and under control of a task scheduler, wherein a task evaluator executes a set of instructions that comprise a task;

maintaining a hierarchical parallel processing infrastructure by the tracker module, said hierarchical parallel processing infrastructure comprising a plurality of links between the plurality of task schedulers, the one or more task evaluators, and the resource processes, wherein each link has an associated identifier; and addressing communications between the plurality of task schedulers, the one or more task evaluators, and the resource processes using a combination of link identifiers.

11. The non-transitory computer readable medium of claim 10, further comprising sending a communication to the tracker module by a task scheduler to request an available resource process.

12. The non-transitory computer readable medium of claim 10, further comprising going offline with a first task scheduler when execution of a last task evaluator under control of the first task scheduler is complete while continuing execution of the tracker module within the parallel processing session.

13. The non-transitory computer readable medium of claim 12, further comprising going online with a second task scheduler while continuing execution of the tracker module within the parallel processing session.

14. The non-transitory computer readable medium of claim 13, further comprising going offline with the second task scheduler when execution of a last task evaluator under control of the second task scheduler is complete while continuing execution of the tracker module within the parallel processing session.

15. The non-transitory computer readable medium of claim 10, further comprising implementing a first predetermined policy through execution of a first task scheduler in the parallel processing session and implementing a second predetermined policy through execution of a second task scheduler in the parallel processing session.

16. The non-transitory computer readable medium of claim 10, further comprising filtering communications by discarding communications having an invalid combination of link identifiers.

17. The non-transitory computer readable medium of claim 10, further comprising changing the identifier associated with a link when a task evaluator goes offline and comes back online.

18. The non-transitory computer readable medium of claim 10, further comprising changing the identifier associated with a link when a resource process is assigned from a first task evaluator to a second task evaluator.

19. A technical system for parallel processing of computer instructions on a plurality of processors located in one or more physical machines that are communicatively coupled with each other via a communication infrastructure, wherein the computer instructions are stored on a computer readable medium accessible by one or more of the processors, the technical system comprising:
 a plurality of processors configured to execute computer instructions stored on a computer readable medium accessible by one or more of the plurality of processors;
 a plurality of virtual machines, each virtual machine having resource processes and each resource process comprising a virtual thread having a main thread and a daemon thread;
 a task module configured to operate in the main thread and schedule a plurality of tasks for evaluation, obtain resource processes to evaluate the plurality of tasks, and evaluate the plurality of tasks using the obtained resource processes;
 a tracker module configured to operate in the daemon thread and coordinate the assignment of process resources to the task module and coordinate communication between tasks being evaluated by declaring and defining communication primitives prior to a task evaluator coming online;
 wherein parallel processing utilizes the tracker module for tracking available resource processes and utilizes the task module for scheduling and evaluating tasks;
 wherein the tracker module is further configured to maintain a hierarchical structure of task schedulers and task evaluators comprising a plurality of links between task schedulers, task evaluators, and resource processes, wherein each link has an associated identifier; and
 wherein the tracker module is further configured to coordinate communication between tasks by addressing communications using a combination of link identifiers.

20. The system of claim 19, wherein the task module comprises a task kernel that includes functionality that is common to all task schedulers and task evaluators.

21. The system of claim 19, wherein the task module is configured to operate as a task evaluator when executing a task and also configured to operate as a task scheduler when coordinating the execution of a task.

22. The system of claim 19, wherein the tracker module is further configured to filter communication between tasks by discarding communications with an invalid combination of link identifiers.

23. The system of claim 19, wherein the tracker module is further configured to change the identifier associated with a link when a task evaluator goes offline and comes back online.

24. The system of claim 19, wherein the tracker module is further configured to change the identifier associated with a link when a resource process is assigned from a first task evaluator to a second task evaluator.

25. A computer implemented method for parallel processing of computer instructions on a plurality of processors located in one or more physical machines that are communicatively coupled with each other via a communication infrastructure, wherein the computer instructions are stored on a computer readable medium accessible by one or more of the processors, the method comprising:
 mapping a plurality of virtual processors to a plurality of processors;
 creating a parallel processing session comprising the plurality of virtual processors;
 executing a tracker module within said parallel processing session on one of said plurality of virtual processors, the tracker module configured to coordinate communication between tasks being evaluated by declaring and defining communication primitives prior to a task evaluator coming online;
 executing a plurality of task schedulers within said parallel processing session on said plurality of virtual processors, each task scheduler configured to obtain resource processes from the tracker module, said resource processes configured to evaluate one or more tasks;
 executing one or more task evaluators within said parallel processing session and under control of a task scheduler, wherein a task evaluator executes a set of instructions that comprise a task;
 maintaining a hierarchical parallel processing infrastructure by the tracker module, said hierarchical parallel processing infrastructure comprising a plurality of links between the plurality of task schedulers, the one or more task evaluators, and the resource processes, wherein each link has an associated identifier; and
 changing the identifier associated with a link when a task evaluator goes offline and comes back online.

26. The method of claim 25, further comprising sending a communication to the tracker module by a task scheduler to request an available resource process.

27. The method of claim 25, further comprising going offline with a first task scheduler when execution of a last task evaluator under control of the first task scheduler is complete while continuing execution of the tracker module within the parallel processing session.

28. The method of claim 27, further comprising going online with a second task scheduler while continuing execution of the tracker module within the parallel processing session.

29. The method of claim 28, further comprising going offline with the second task scheduler when execution of a last task evaluator under control of the second task scheduler is complete while continuing execution of the tracker module within the parallel processing session.

30. The method of claim 25, further comprising implementing a first predetermined policy through execution of a first task scheduler in the parallel processing session and implementing a second predetermined policy through execution of a second task scheduler in the parallel processing session.

31. The method of claim 25, further comprising addressing communications between the plurality of task schedulers, the one or more task evaluators, and the resource processes using a combination of link identifiers.

32. The method of claim 25, further comprising filtering communications by discarding communications having an invalid combination of link identifiers.

33. The method of claim 25, further comprising changing the identifier associated with a link when a resource process is assigned from a first task evaluator to a second task evaluator.

34. A computer implemented method for parallel processing of computer instructions on a plurality of processors located in one or more physical machines that are communicatively coupled with each other via a communication infrastructure, wherein the computer instructions are stored on a computer readable medium accessible by one or more of the processors, the method comprising:

mapping a plurality of virtual processors to a plurality of processors;

creating a parallel processing session comprising the plurality of virtual processors;

executing a tracker module within said parallel processing session on one of said plurality of virtual processors, the tracker module configured to coordinate communication between tasks being evaluated by declaring and defining communication primitives prior to a task evaluator coming online;

executing a plurality of task schedulers within said parallel processing session on said plurality of virtual processors, each task scheduler configured to obtain resource processes from the tracker module, said resource processes configured to evaluate one or more tasks;

executing one or more task evaluators within said parallel processing session and under control of a task scheduler, wherein a task evaluator executes a set of instructions that comprise a task;

maintaining a hierarchical parallel processing infrastructure by the tracker module, said hierarchical parallel processing infrastructure comprising a plurality of links between the plurality of task schedulers, the one or more task evaluators, and the resource processes, wherein each link has an associated identifier; and changing the identifier associated with a link when a resource process is assigned from a first task evaluator to a second task evaluator.

35. The method of claim 34, further comprising sending a communication to the tracker module by a task scheduler to request an available resource process.

36. The method of claim 34, further comprising going offline with a first task scheduler when execution of a last task evaluator under control of the first task scheduler is complete while continuing execution of the tracker module within the parallel processing session.

37. The method of claim 36, further comprising going online with a second task scheduler while continuing execution of the tracker module within the parallel processing session.

38. The method of claim 37, further comprising going offline with the second task scheduler when execution of a last task evaluator under control of the second task scheduler is complete while continuing execution of the tracker module within the parallel processing session.

39. The method of claim 34, further comprising implementing a first predetermined policy through execution of a first task scheduler in the parallel processing session and implementing a second predetermined policy through execution of a second task scheduler in the parallel processing session.

40. The method of claim 34, further comprising addressing communications between the plurality of task schedulers, the one or more task evaluators, and the resource processes using a combination of link identifiers.

41. The method of claim 34, further comprising filtering communications by discarding communications having an invalid combination of link identifiers.

42. The method of claim 34, further comprising changing the identifier associated with a link when a task evaluator goes offline and comes back online.

43. A non-transitory computer readable medium having stored thereon code for causing a plurality of processors to perform the steps for parallel processing, the steps comprising:

mapping a plurality of virtual processors to a plurality of processors;

creating a parallel processing session comprising the plurality of virtual processors;

executing a tracker module within said parallel processing session on one of said plurality of virtual processors, the tracker module configured to coordinate communication between tasks being evaluated by declaring and defining communication primitives prior to a task evaluator coming online;

executing a plurality of task schedulers within said parallel processing session on said plurality of virtual processors, each task scheduler configured to obtain resource processes from the tracker module, said resource processes configured to evaluate one or more tasks;

executing one or more task evaluators within said parallel processing session and under control of a task scheduler, wherein a task evaluator executes a set of instructions that comprise a task;

maintaining a hierarchical parallel processing infrastructure by the tracker module, said hierarchical parallel processing infrastructure comprising a plurality of links between the plurality of task schedulers, the one or more task evaluators, and the resource processes, wherein each link has an associated identifier; and changing the identifier associated with a link when a task evaluator goes offline and comes back online.

44. The non-transitory computer readable medium of claim 43, further comprising sending a communication to the tracker module by a task scheduler to request an available resource process.

45. The non-transitory computer readable medium of claim 43, further comprising going offline with a first task scheduler when execution of a last task evaluator under control of the first task scheduler is complete while continuing execution of the tracker module within the parallel processing session.

46. The non-transitory computer readable medium of claim 45, further comprising going online with a second task scheduler while continuing execution of the tracker module within the parallel processing session.

47. The non-transitory computer readable medium of claim 46, further comprising going offline with the second task scheduler when execution of a last task evaluator under control of the second task scheduler is complete while continuing execution of the tracker module within the parallel processing session.

48. The non-transitory computer readable medium of claim 43, further comprising implementing a first predetermined policy through execution of a first task scheduler in the parallel processing session and implementing a second predetermined policy through execution of a second task scheduler in the parallel processing session.

49. The non-transitory computer readable medium of claim 43, further comprising addressing communications between the plurality of task schedulers, the one or more task evaluators, and the resource processes using a combination of link identifiers.

50. The non-transitory computer readable medium of claim 43, further comprising filtering communications by discarding communications having an invalid combination of link identifiers.

51. The non-transitory computer readable medium of claim 43, further comprising changing the identifier associated with a link when a resource process is assigned from a first task evaluator to a second task evaluator.

52. A non-transitory computer readable medium having stored thereon code for causing a plurality of processors to perform the steps for parallel processing, the steps comprising:
mapping a plurality of virtual processors to a plurality of processors;
creating a parallel processing session comprising the plurality of virtual processors;
executing a tracker module within said parallel processing session on one of said plurality of virtual processors, the tracker module configured to coordinate communication between tasks being evaluated by declaring and defining communication primitives prior to a task evaluator coming online;
executing a plurality of task schedulers within said parallel processing session on said plurality of virtual processors, each task scheduler configured to obtain resource processes from the tracker module, said resource processes configured to evaluate one or more tasks;
executing one or more task evaluators within said parallel processing session and under control of a task scheduler, wherein a task evaluator executes a set of instructions that comprise a task;
maintaining a hierarchical parallel processing infrastructure by the tracker module, said hierarchical parallel processing infrastructure comprising a plurality of links between the plurality of task schedulers, the one or more task evaluators, and the resource processes, wherein each link has an associated identifier; and
changing the identifier associated with a link when a resource process is assigned from a first task evaluator to a second task evaluator.

53. The non-transitory computer readable medium of claim 52, further comprising sending a communication to the tracker module by a task scheduler to request an available resource process.

54. The non-transitory computer readable medium of claim 52, further comprising going offline with a first task scheduler when execution of a last task evaluator under control of the first task scheduler is complete while continuing execution of the tracker module within the parallel processing session.

55. The non-transitory computer readable medium of claim 54, further comprising going online with a second task scheduler while continuing execution of the tracker module within the parallel processing session.

56. The non-transitory computer readable medium of claim 55, further comprising going offline with the second task scheduler when execution of a last task evaluator under control of the second task scheduler is complete while continuing execution of the tracker module within the parallel processing session.

57. The non-transitory computer readable medium of claim 52, further comprising implementing a first predetermined policy through execution of a first task scheduler in the parallel processing session and implementing a second predetermined policy through execution of a second task scheduler in the parallel processing session.

58. The non-transitory computer readable medium of claim 52, further comprising addressing communications between the plurality of task schedulers, the one or more task evaluators, and the resource processes using a combination of link identifiers.

59. The non-transitory computer readable medium of claim 52, further comprising filtering communications by discarding communications having an invalid combination of link identifiers.

60. The non-transitory computer readable medium of claim 52, further comprising changing the identifier associated with a link when a task evaluator goes offline and comes back online.

61. A technical system for parallel processing of computer instructions on a plurality of processors located in one or more physical machines that are communicatively coupled with each other via a communication infrastructure, wherein the computer instructions are stored on a computer readable medium accessible by one or more of the processors, the technical system comprising:
a plurality of processors configured to execute computer instructions stored on a computer readable medium accessible by one or more of the plurality of processors;
a plurality of virtual machines, each virtual machine having resource processes and each resource process comprising a virtual thread having a main thread and a daemon thread;
a task module configured to operate in the main thread and schedule a plurality of tasks for evaluation, obtain resource processes to evaluate the plurality of tasks, and evaluate the plurality of tasks using the obtained resource processes;
a tracker module configured to operate in the daemon thread and coordinate the assignment of process resources to the task module and coordinate communication between tasks being evaluated by declaring and defining communication primitives prior to a task evaluator coming online;
wherein parallel processing utilizes the tracker module for tracking available resource processes and utilizes the task module for scheduling and evaluating tasks;
wherein the tracker module is further configured to maintain a hierarchical structure of task schedulers and task evaluators comprising a plurality of links between task schedulers, task evaluators, and resource processes, wherein each link has an associated identifier; and
wherein the tracker module is further configured to change the identifier associated with a link when a task evaluator goes offline and comes back online.

62. The system of claim 61, wherein the task module comprises a task kernel that includes functionality that is common to all task schedulers and task evaluators.

63. The system of claim 61, wherein the task module is configured to operate as a task evaluator when executing a task and also configured to operate as a task scheduler when coordinating the execution of a task.

64. The system of claim 61, wherein the tracker module is further configured to coordinate communication between tasks by addressing communications using a combination of link identifiers.

65. The system of claim 61, wherein the tracker module is further configured to filter communication between tasks by discarding communications with an invalid combination of link identifiers.

66. The system of claim 61, wherein the tracker module is further configured to change the identifier associated with a link when a resource process is assigned from a first task evaluator to a second task evaluator.

67. A technical system for parallel processing of computer instructions on a plurality of processors located in one or more physical machines that are communicatively coupled with each other via a communication infrastructure, wherein the computer instructions are stored on a computer readable medium accessible by one or more of the processors, the technical system comprising:
- a plurality of processors configured to execute computer instructions stored on a computer readable medium accessible by one or more of the plurality of processors;
- a plurality of virtual machines, each virtual machine having resource processes and each resource process comprising a virtual thread having a main thread and a daemon thread;
- a task module configured to operate in the main thread and schedule a plurality of tasks for evaluation, obtain resource processes to evaluate the plurality of tasks, and evaluate the plurality of tasks using the obtained resource processes;
- a tracker module configured to operate in the daemon thread and coordinate the assignment of process resources to the task module and coordinate communication between tasks being evaluated by declaring and defining communication primitives prior to a task evaluator coming online;
- wherein parallel processing utilizes the tracker module for tracking available resource processes and utilizes the task module for scheduling and evaluating tasks;
- wherein the tracker module is further configured to maintain a hierarchical structure of task schedulers and task evaluators comprising a plurality of links between task schedulers, task evaluators, and resource processes, wherein each link has an associated identifier; and
- wherein the tracker module is further configured to change the identifier associated with a link when a resource process is assigned from a first task evaluator to a second task evaluator.

68. The system of claim 67, wherein the task module comprises a task kernel that includes functionality that is common to all task schedulers and task evaluators.

69. The system of claim 67, wherein the task module is configured to operate as a task evaluator when executing a task and also configured to operate as a task scheduler when coordinating the execution of a task.

70. The system of claim 67, wherein the tracker module is further configured to coordinate communication between tasks by addressing communications using a combination of link identifiers.

71. The system of claim 67, wherein the tracker module is further configured to filter communication between tasks by discarding communications with an invalid combination of link identifiers.

72. The system of claim 67 wherein the tracker module is further configured to change the identifier associated with a link when a task evaluator goes offline and comes back online.

* * * * *